United States Patent Office 2,705,030
Patented Mar. 29, 1955

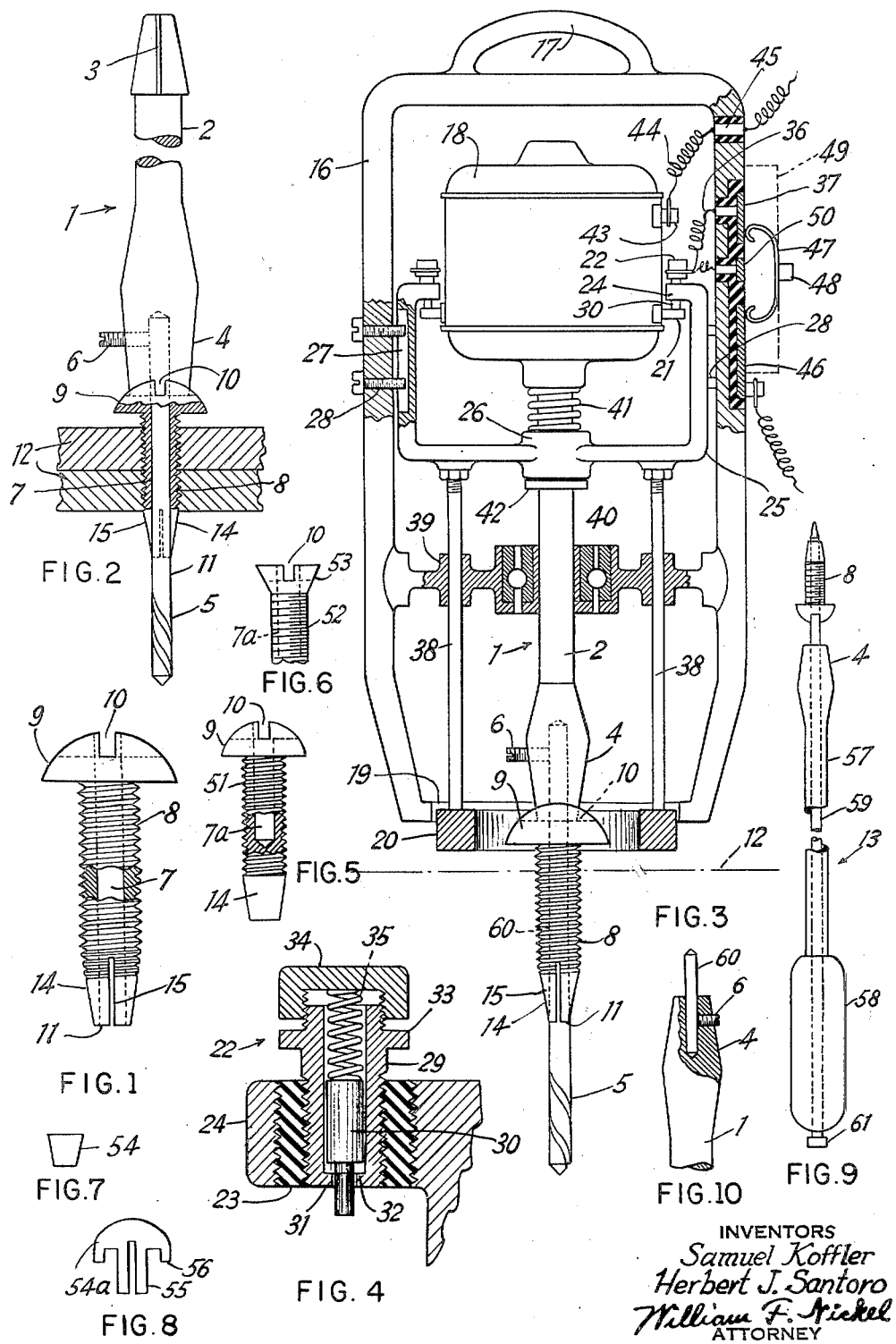

2,705,030

POWER OPERATED SCREWDRIVER

Samuel Koffler, Brooklyn, and Herbert Joseph Santoro, Seaford, N. Y.

Application June 7, 1952, Serial No. 292,286

5 Claims. (Cl. 144—32)

This invention is an improved screw and tool for rotating it; particularly a screw and tool for affixing the screw to separate parts for the purpose of securing said parts together.

An important object of our invention is to provide a screw for uniting sheets and other parts of metal and other materials, and adapted to cooperate with a drill tap for boring a hole to facilitate the insertion of the screw into said parts, or with a hand punch for the same purpose.

Another object of our invention is to provide a tool having an element capable of drilling a hole sufficient for the insertion of the end of a screw and a member to cooperate with the boring element to force the screw into the hole and rotate the screw into tight fixed position.

Our invention is especially designed for joining flat parts of metal, such as sheets and plates. Such parts being hard, an ordinary threaded screw cannot be forced into them as in wood, and an opening must therefore be made before the screw can take hold and be rotated to impel the shank of the screw into the sheets till the screw is fully in place. To this end the tool comprises a drill tap and a screw driving member, the tap making the hole and the member pushing the screw into it and then turning the screw till the sheets are firmly attached to each other.

In practice, the tool or implement is adapted to operate to turn a screw that is hollow with a longitudinal bore partly or all the way through it, and with a head shaped for engagement by the driving member. On the end of the driving member is a drill tap that forms the hole, and as soon as the end of the screw reaches the hole, the turning of the screw follows till the shank of the screw has been forced in as far as necessary.

The nature of the invention is fully described hereinafter, and the preferred embodiments are illustrated in the accompanying drawings. But the disclosure is explanatory only, and we may change the constructions shown, in various minor respects, without really altering any of the essential characteristics of the device.

On said drawings:

Figure 1 is a side elevation of a fastener screw according to our invention.

Figure 2 is a side elevation of a member for drilling a hole to receive the screw and forcing it into the hole, the screw being shown in section.

Figure 3 is a longitudinal section of a power tool for operating said member.

Figure 4 shows a detail in section; and

Figures 5 to 10 inclusive show details.

The member for drilling holes and forcing screws into the holes is indicated at 1. It has a shank 2 with a key 3 on one end and a blade or flat tip 4 at the other. This other or front end has a bore therein to receive a drill tap 5, held on the tip 4 by a binding screw 6. The drill tap projects beyond the blade 4 to pass into a longitudinal bore 7 extending completely through a threaded screw 8 which has a head 9 with a kerf or other recess 10. The front end of the screw tapers to a thin annular edge 11. The screw 8 is slipped upon the drill tap and when the blade 4 is fitted into the recess 10, the drill tap projects beyond the terminal edge 11 of the screw. The tool is used with the screw 8 on the drill tap 5 by pressing the end of the element 5 against two or more sheets or plates 12 of metal or other parts to be joined, and causing the member 1 to revolve. The drill cuts a round hole in the sheets 12, and continued pressure on the member 1 forces the thin edge 11 of the screw into the hole and the blade 4 then turns the screw farther and farther into the hole till the head 9 is in full contact with the outer face of one of the plates 12.

In Figures 5, 6, 9 and 10, I illustrate screws with a bore extending partway through the length from the head inward. These screws are turned into a hole with a screw driver that has a bit or projection entering the bore while the blade of the screw engages the kerf in the head.

The screw 8 has a tapered end 14 with slits 15 extending inward from the edge 11. The slits 15 divide the portion 14 into separate prongs which are flexible to some extent, so that the portions of the screw between the slits 15, will contact and the insertion of the end of the screw into the hole is thus facilitated. The member 1 can be rotated by hand or by power, as will be set forth later. The key or groove 3 is adapted for insertion into a chuck of well-known design, mounted at the end of a brace or hand drill. The threads on the screw engage the hole in the plates 12 tightly, and the screw affixes one plate to the other as efficiently as if a nut were attached to the shank of the screw 8 projecting beyond the plates 12. Of course, the member 1 can be utilized to drive screws like the screw 8 into the wood or other non-metallic material, as well as metals.

The power tool for the shank 1 is made up of a casing 16 having a handle 17 at one end. Within the casing, adjacent said end, is an electric motor 18, controlled by an outside switch to be described later. At the opposite end of casing 16 a contact ring 21 is supported, by which the electric supply circuit is controlled, as will presently be described. The member 1, for operating the screw, is connected to be rotated by the motor, and as before, this member has at its outer end, a tip or blade 4 and tap 5.

A fixed insulated terminal 21, shown as mounted on the housing of the motor 18, cooperates with an insulated binding post 22, secured in an insulating brushing 23 on the bent end 24 of one of a pair of oppositely disposed arms 25. These arms are affixed to a hub 26 encircling the member 1 and slidable thereon; and each arm has a key-way 27 engaged by pins or studs 28 in the casing 16, so that the hub 26 can move back and forth, but is held against rotation. In the bushing 23 is a metallic sleeve 29 containing a carbon brush 30 or terminal of other conductive material; and one end of the sleeve 29 presents to the terminal 21 an opening with an inturned edge or rim 31. The brush 30 has a shoulder 32 at one end, and beyond the shoulder it is of reduced diameter to project out of the opening 31 in the sleeve 29 to a slight extent. Near the opposite end the sleeve 29 has a flange or collar 33 and this end is threaded to receive a cap nut 34 to bind a wire against the collar 33. In the sleeve 29 is a spring 35, which presses against the brush 30 and caused it to protrude from the sleeve 29. To the binding post 22 is affixed a conductor 36 which is insulated from the casing 16 and is connected to a switch terminal 37 insulatably mounted on the outside of the casing 16.

The arms 25 have a pair of rods 38 affixed thereto, and extending along the inside of the casing and made fast at their opposite ends to the ring 20. These arms are slidably supported in bearings 90 carried by a spider having an antifriction bearing 40 at the center for the member 1. The spider is of course fixed against rotation in the casing 16, and a spring 41 between the motor housing and the hub 26 normally acts to press the hub against a collar 42 on the member 1, so located that when the hub is in contact with this collar, the brush 30 is in contact with the terminal 21, and the ring 20 projects from the casing 16 to a point a little beyond the plane of the flat front face of the head 9 of the screw 8 when the latter is slipped upon the drill tap 5 and is engaged by the tip 4 of the member 1 in the recess 10 of the head 9 of the screw. In this position the brush 30 will be pressed back a little, as shown by the broken lines at the end of the brush in Figure 4.

The other terminal 43 of the motor is connected by a conductor 44 to an insulated terminal 45 on the casing 16; and to this terminal 45 is connected one line of the supply circuit; the other line being connected to an insulated switch terminal 46 on the exterior of the casing 16. The terminals 45 and 46 can be united to a conductor and plug (not shown) to the supply circuit of the motor in the usual way, and a movable switch terminal 47 bridges the terminals 37 and 46 to close the motor circuit. This terminal 47 has an insulating knob 48 to be manipulated by the operator, and the entire switch may be enclosed within a cover 49 on the casing.

In practice, the operator puts a hollow screw upon the tap 5, and presses the tap against the part to receive the screw. He then closes the switch, and the motor and member 1 revolve. The motor may be coupled to the member 3 by a reducing gear, and the motor may have a starting rheostat or any other conventional accessory. The member 1 will force the screw 8 into the hole made by the tap 5 in turning; and force the screw in till the head 9 begins to rub against the outer surface of the part receiving the screw. At the same time the ring 20 will make contact with said surface, and push back on the rods 38 to disconnect the motor circuit at the terminls 21 and 22. The carbon brush 30 will separate from the terminal 21 at the right moment.

The switch will have an extra insulated terminal 50 on the casing 16 under the cover 49 and connected to the terminal 22. This terminal will lie between the terminals 37 and 46. When the ring 20 operates to break the motor circuit, the operator of course draws back the knob 48. In so doing, he will close the circuit again for a brief instant before the movable terminal 47 leaves the short terminal 50. The motor will thus give a short additional rotation to the screw to make sure the head 9 of the screw is tight against the sheets 12. But this additional rotation will entail no risk of twisting the head 9 of the screw off, or otherwise impairing the screw. When the switch is closed to start the tool, the extra terminal 50 will of course cause closing of the motor circuit, but the start of the operation only rotates the tap 5 against the sheets 12. The full operation will commence as soon as the terminal 47 bridges the terminals 37 and 46. The motor 18 is fixed in the frame 16 and casing 49 is long enough for the switch 47 to clear the terminal 50 when the switch is retracted.

In Figure 5, the screw 51 has a head 9 and kerf 10, tapered front end 14 and bore 7a terminating short of the end 14. This screw is inserted into a hole made by piercing the two plates as shown in Figure 2, and forced in with a screw driver with a shank 10, as shown in Figure 10, having a blade or tip 4 or projection 60 that fits the bore 7a. The projection 60 may be formed like a punch or drill bit to punch or cut the hole for the screw 51. Figure 6 also illustrates a screw 52, with a flat head 53 for the kerf 10 and a bore 7a as in Figure 5. This screw is operated in the same manner. After insertion the bore 7a may be closed at the head by a plug 53 or a cap 54 with a rounded head 55 and a split stem 56 to enter the bore 7a.

The screw driver of Figure 9 has a shank 57 and a handle 58. A punch rod 59 extends through it and its point projects from the blade 4. This rod has a small head 61 at the handle and it is used both to punch the hole and to carry the screw which is inserted into the hole thus made.

Having described our invention, what we believe to be new is:

1. An implement for rotating a hollow fastener screw having a head with a kerf and a shank with a bore through the shank and a conical tip at the opposite end of the screw, said implement having a tip for engaging the kerf in the head of the screw; and a part projecting from said tip to enter said bore.

2. An implement for rotating a hollow fastener screw having a head with a kerf at one end and a shank with a bore therethrough, and a conical tip at the opposite end of the screw, said implement having a tip to engage said kerf and a drill tap united to the outer end of the tip to be inserted into the bore and project from the front end of the screw.

3. An implement for rotating a fastener screw comprising a shank with a tip to engage a kerf in one end of the screw, a drill tap attached to said tip to be inserted into a bore through the screw, an electric motor carried by said implement, switch contacts for the motor, and a movable part adjacent said tip and joined to one of said contacts to disconnect the motor when the part abuts the surface into which the screw is turned by said shank.

4. A tool for rotating a fastening screw having a threaded shank with a bore through it, the tool having a member with a tip to engage a kerf in the end of the screw, the tip having a drill tap fixed thereto to be inserted into the bore and projects from the front end of the screw, an electric motor to revolve said member, a casing for said motor and said member, said casing having an opening for the tip of said member and said tap, a movable ring in said opening, a switch for said motor on the exterior of said casing, a fixed terminal and a movable terminal within the casing in circuit with said motor and said switch, and means for connecting said movable terminal to said ring.

5. A tool for rotating a fastening screw having a threaded shank with a bore through it, the tool having a member with a tip to engage a kerf in the end of the screw, the tip having a drill tap fixed thereto to be inserted into the bore and project from the front end of the screw, an electric motor to revolve said member, a casing for said motor and said member, said casing having an opening for the tip of said member and said tap, a movable ring in said opening, a switch for said motor on the exterior of said casing, a fixed terminal and a movable terminal within the casing in circuit with said motor in said switch, and means for connecting said movable terminal to said ring, said means comprising a rod attached to said ring and extending into said casing, and a fixed bearing in said casing slidably mounting said rod.

References Cited in the file of this patent

UNITED STATES PATENTS

| Number | Name | Date |
|---|---|---|
| 126,366 | Wills | Apr. 30, 1872 |
| 1,069,312 | Zwiebel | Aug. 5, 1913 |
| 1,260,154 | Day | Mar. 19, 1918 |
| 1,345,708 | Schneider | July 6, 1920 |
| 1,797,390 | Wood | Mar. 24, 1931 |
| 2,122,915 | Olson | July 5, 1938 |
| 2,292,195 | Brown | Aug. 4, 1942 |
| 2,565,505 | Lamb | Aug. 28, 1951 |
| 2,604,912 | Walker | July 29, 1952 |
| 2,659,255 | Bates | Nov. 17, 1953 |